(12) United States Patent
Forsythe et al.

(10) Patent No.: US 8,046,770 B2
(45) Date of Patent: Oct. 25, 2011

(54) METHODS, SYSTEMS, AND COMPUTER PROGRAM PRODUCTS FOR MANAGING PRODUCTIVITY

(75) Inventors: Herbert Forsythe, Birmingham, AL (US); Saritha Chadalavada, Atlanta, GA (US); Elena Zlatopolsky, Roswell, GA (US); Gary Hasty, Powder Springs, GA (US); Diane LaMontagne, Ponce Inlet, FL (US); James Collins, Palm City, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1942 days.

(21) Appl. No.: 10/973,109

(22) Filed: Oct. 25, 2004

(65) Prior Publication Data

US 2006/0090160 A1    Apr. 27, 2006

(51) Int. Cl.
*G06F 9/46* (2006.01)
(52) U.S. Cl. ........................................................ 718/107
(58) Field of Classification Search .................... 718/107
See application file for complete search history.

(56) References Cited

U.S. PATENT DOCUMENTS 7,069,229 B1 * 6/2006 Richardson et al. .............. 705/9
2004/0205206 A1 * 10/2004 Naik et al. .................... 709/230

* cited by examiner

*Primary Examiner* — Meng An
*Assistant Examiner* — Mengyao Zhe
(74) *Attorney, Agent, or Firm* — Cantor Colburn LLP

(57) ABSTRACT

Exemplary embodiments relate to methods, systems, and computer program products for managing productivity. Methods include establishing a planned execution time for performing a task. The task is assigned a unique identifier. Methods further include comparing the planned execution time with an actual execution time for performing the task and, based upon the results, calculating an efficiency rating. The actual execution time is extracted from a task dispatch system via the unique identifier. Methods also include associating the efficiency rating with one or more of: an individual performing the task, a supervisor of the individual performing the task, a group of individuals with which the individual performing the task is associated, and an organization associated with the individual performing the task.

17 Claims, 8 Drawing Sheets

| Technician Name | 2004-09-09 14:53:21.0 EDT |
|---|---|
| Technician's Daily Listing of jobs worked on(ESM3) | RC | NS407301 |
| Date of Job Data | 08-Sep-2004 |
| CLLI | JCVLFLAR |
| Work Code | FR |
| Work Type | ADS |
| Service Function | ADSL Provisioning |
| Priority | 1 |
| Tracking Key | 0426 ADS 09-08-04 |
| Work ID | 251FR0064 |
| Critical Date | 2004-09-08 |
| Time Closed | 2004-09-08 11:54:00.0 |
| Total Time On Completion Date | 0.0 |
| Total Time Prior to Completion Date | 0.0 |
| Total Time to Work ID | 0.0 |
| Number of Times Loaded – All Techs | 2 |
| Total Time Other Techs – Same Work ID | 0.25 |
| EOD Status | C |
| Jeopardy Code | / |
| Work Done TSC_FL1 / T1 WCAUSE | |
| Work Done TSC_FL2 / T1 WEQUIP | |
| Work Done Code TSC_FL3 | |
| Number Of Units | 1 |
| Total ESM Planned Time | 0.0 |
| Quality | |
| Invalid Work Type | NO |
| Invalid TCS_FL3 Org Code | NO |
| Invalid Work Done Code | NO |
| Invalid Jeopardy Code / Usage | NO |

FIG. 8

Weekly/Monthly Detailed Trend Report by CLLI or Network Management Turf (ESM 10) | Report Run Time 09-Sep-2004 14:53:21.0 EDT
Generate Printable HTML | Database Load Time 2004-09-09 14:53:21.0 EDT | View calendar

| Location | Time Period | | | | | | | | |
|---|---|---|---|---|---|---|---|---|---|
| North Florida | Sep 1-4 | | | | | Sep 5-8 | | Sep-2004 | |
| Work Type Hierarchy | WED | THU | FRI | SAT | Week Ending | Week Ending | Sep 2004 Month to Date | | |
| Total CO Operations | 1874.83 | 1723.2 | 1492.75 | 245.57 | 5336.35 | 3562.95 | 8899.3 | | |
| Other Measured ESM | 381.22 | 295.8 | 260.27 | 58.48 | 995.77 | 546.08 | 1541.85 | | |
| Total Non-Des Serv Prov | 252.05 | 205.08 | 161.48 | 40.45 | 659.07 | 414.13 | 1073.2 | | |
| Total Assistance | 196.63 | 214.47 | 150.82 | 28.67 | 590.58 | 359.93 | 950.52 | | |
| Total Des Serv Prov | 307.75 | 284.62 | 276.23 | 24.43 | 893.03 | 611.32 | 1504.35 | | |
| Total Non ESM (Unmeas) | 371.88 | 392.48 | 354.08 | 59.1 | 1177.55 | 735.98 | 1913.53 | | |
| Total Ntwk Provisioning | 10.12 | 25.82 | 18.18 | 3.33 | 57.45 | 62.47 | 119.92 | | |
| Total Preventative Mtce | 142.52 | 124.47 | 102.07 | 13.62 | 382.67 | 205.38 | 588.05 | | |
| Total Repair | 212.67 | 180.47 | 169.62 | 17.48 | 580.23 | 627.65 | 1207.88 | | |
| – Total Priority 1 | 1248.72 | 1103.95 | 883.07 | 156.32 | 3392.05 | 2367.4 | 5759.45 | | |
| – Total Priority 2 | 147.13 | 133.47 | 148.52 | 27.3 | 456.42 | 305.17 | 761.58 | | |
| – Total Priority 3 | 107.1 | 93.3 | 107.08 | 2.85 | 310.33 | 154.4 | 464.73 | | |
| Total Project (Unmeas) | 286.95 | 317.2 | 285.95 | 56.35 | 946.45 | 570.98 | 1517.43 | | |
| – Tmg,Meet,& Union (Unmeas) | 84.93 | 75.28 | 68.13 | 2.75 | 231.1 | 165.0 | 396.1 | | |

METHODS, SYSTEMS, AND COMPUTER PROGRAM PRODUCTS FOR MANAGING PRODUCTIVITY

BACKGROUND OF THE INVENTION

Exemplary embodiments of the invention relate generally to managing productivity, and more particularly, to methods, systems, and computer program products for managing productivity and forecasting load balance requirements.

Business enterprises are continuously looking for new and improved methods of tracking worker productivity and, if needed, adjusting their business processes in response to weaknesses discovered in an effort to maximize human resources without sacrificing quality of service. Understanding the nature of each job, drilled down to a detailed task level, along with existing or potential factors that may affect the successful execution of each of these jobs is important in order for the business to establish realistic productivity goals and set performance standards. Existing business processes have been lacking in this level of understanding, such that any performance standards established would not likely be capable of accurate measurement in terms of whether a task was successfully completed. In addition, larger enterprises have been known to incur significant difficulties in sifting through voluminous databases of task execution data and determining which task data is relevant and how the data should be interpreted (e.g., the reason a task is reported to have exceeded a set time standard by several hours may be attributed to poor worker productivity when, in fact, an unforeseen obstacle caused the time discrepancy).

Effective tracking of worker productivity is also important in order for businesses to forecast potential changes needed in workload and address these changes so that the appropriate manpower is on hand at any given time.

SUMMARY OF THE INVENTION

Exemplary embodiments relate to methods, systems, and computer program products for managing productivity. Methods include establishing a planned execution time for performing a task. The task is assigned a unique identifier. Methods further include comparing the planned execution time with an actual execution time for performing the task and, based upon the results, calculating an efficiency rating. The actual execution time is extracted from a task dispatch system via the unique identifier. Methods also include associating the efficiency rating with one or more of: an individual performing the task, a supervisor of the individual performing the task, a group of individuals with which the individual performing the task is associated, and an organization associated with the individual performing the task.

Systems for managing productivity include a host system executing a dispatch system and a productivity management application. Systems also include a storage device in communication with the host system. The productivity management application receives a planned execution time for performing a task, compares the planned execution time with an actual execution time for performing the task. The actual execution time is extracted from a task dispatch system via a unique identifier assigned to the task. The productivity management application further calculates an efficiency rating based upon the comparisons, associates the efficiency rating with at least one of: an individual performing the task; a supervisor of an individual performing the task; a group of individuals associated with an individual performing the task; and an organization associated with an individual performing the task. The productivity management application stores the efficiency rating in the storage device.

Computer program products for managing productivity include a storage medium readable by a processing circuit and storing instructions for execution by the processing circuit for facilitating a method. The method includes establishing a planned execution time for performing a task. The task is assigned a unique identifier. The method further includes comparing the planned execution time with an actual execution time for performing the task and, based upon the results, calculating an efficiency rating. The actual execution time is extracted from a task dispatch system via the unique identifier. The method also includes associating the efficiency rating with one or more of: an individual performing the task, a supervisor of the individual performing the task, a group of individuals with which the individual performing the task is associated, and an organization associated with the individual performing the task.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 5 is an exemplary user interface screen illustrating a sample daily crew summary report for individuals reporting to a manager;

FIG. 6 is an exemplary user interface screen illustrating a sample daily summary report for a technician;

FIG. 7 is an exemplary user interface screen illustrating a sample job detail report for a technician; and FIG. 8 is an exemplary user interface screen illustrating a sample detailed trend report.

DETAILED DESCRIPTION OF EXEMPLARY EMBODIMENTS OF THE INVENTION

In accordance with exemplary embodiments, a productivity management system is provided for facilitating the tracking and governance of performance standards established by a business enterprise. Engineered service measures include scientifically derived and physically verified times established for performing specific tasks associated with each job that is performed within the enterprise environment. These times may be based upon normal skill, prescribed methods, and for individuals working under normal conditions. Factors that may potentially affect the successful execution of each of these jobs is taken into account in order to acquire the most accurate picture of worker performance. The productivity management system also provides a method for load balance forecasting to facilitate necessary short and long term load balance assessments.

While described herein with respect to telecommunications work activities conducted by technicians in a central office environment, it will be understood by those skilled in the art that the productivity management activities may be equally implemented in any environment that measures the performance of task-based functions.

Figure 1:
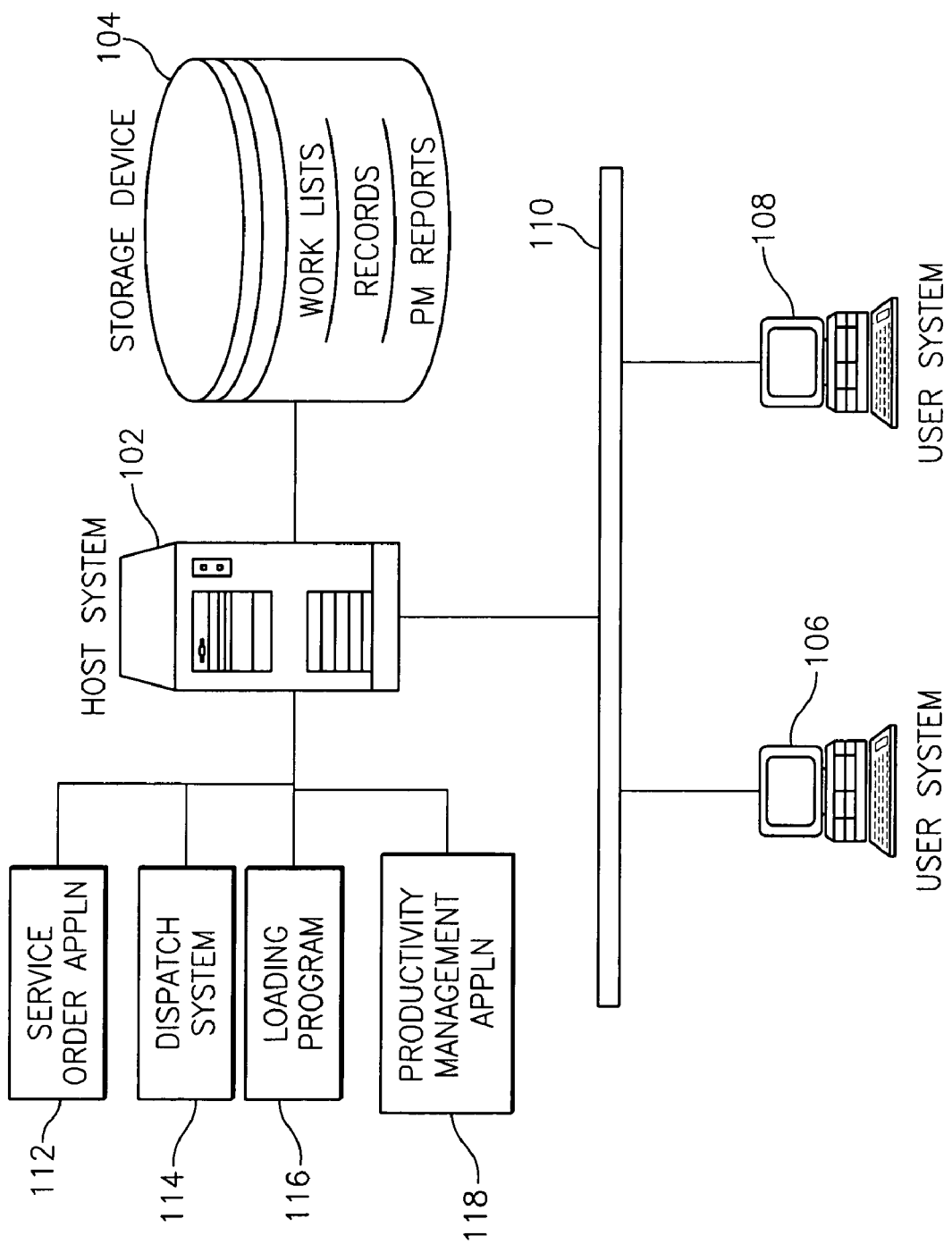
FIG. 1 is a block diagram of a system upon which productivity management activities may be implemented in exemplary embodiments.

Turning now to FIG. 1, a system 100 upon which the productivity management activities may be implemented in accordance with exemplary embodiments will now be described. System 100 of FIG. 1 includes a host system 102 in communication with a storage device 104. The host system 102 depicted in FIG. 1 may be implemented using one or more servers operating in response to a computer program stored in a storage medium accessible by the server(s). Host system 102 may operate as a network server (e.g., a web server) to communicate with one or more user systems (e.g., 106, 108). Host system 102 may also include a firewall (not shown) to prevent unauthorized access and enforce any limitations placed on authorized users of host system 102. The firewall may be implemented using conventional hardware and/or software as is known in the art.

Host system 102 may also operate as an application server. In accordance with exemplary embodiments, host system 102 executes one or more computer programs (e.g., service order application 112, dispatch system 114, loading program 116, and productivity management application 118) for implementing the productivity management functions described herein. Processing may be shared by one or more of user systems 106, 108 and host system 102 by providing an application (e.g., java applet) to user systems 106, 108. Alternatively, one or more of user systems 106, 108 may include stand-alone software applications for performing a portion or all of the processing described herein. As previously described, it is understood that separate servers may be utilized to implement the network server functions and the application server functions. Alternatively, the network server, the firewall, and the application server may be implemented by a single server executing computer programs (e.g., 112-118) to perform the requisite functions.

In exemplary embodiments, service order application 112 receives requests for work activities such as installation tasks, repair tasks, and equipment/service upgrade tasks. Information relating to the request is entered into service order application 112 and includes, e.g., a task description, a task location, a task date, etc. A service order may be generated therefrom via service order application 112.

In exemplary embodiments, dispatch system 114 receives the service orders, sorts through the information contained therein, and identifies a specific group or entity that is responsible for each order. For example, a service order requesting a new installation may be assigned to an office or entity that is geographically accessible to the installation location. Dispatch system 114 segregates the incoming service orders by specified criteria (e.g., geographic location of task) and builds a task record for each service order. The task records may be entered into task record table 204 and stored in storage device 104 where they await further processing.

Dispatch system 114 may also designate tasks relating to specified preventative maintenance or routine procedures that are assignable to a group or entity. For example, a routine procedure may be to inspect fire-extinguishing equipment at a location on a weekly basis. This preventative maintenance or routine work may also be entered into task records in table 204.

In exemplary embodiments, loading program 116 refers to an interface application used by workers (also referred to herein as technicians) for accessing daily or periodic work lists for which they are responsible. A work list may be, for example, a daily list of tasks assigned to an individual. A technician logs into loading program 116, enters his/her name or identification, and prints out a work list with the task information. The assignment of tasks to a specified technician may be accomplished via loading program 116 by a supervisor (e.g., associating a task with a technician using the task identifier and the technician name or identification). Loading program 116 may also be used by a technician to enter task execution information for each assigned task. The technician may enter, for example, the starting time of the task, the time that the task was completed, and any relevant information (e.g., difficulties encountered in performing the task, a task status if the task could not be completed, etc.).

In accordance with exemplary embodiments, productivity management application 118 includes instructions for extracting selected task information from storage device 104 (e.g., task records from table 204) and applying business logic to the extracted information. Selected task information and the results of the application of business logic may be recorded in productivity records in table 206 and/or group records in table 208. The records in tables 206 and 208 are implemented in a searchable database that is accessible to authorized individuals who may then generate reports resulting from the searches. Productivity management application 118 may be, for example, an application programming interface that manipulates task data acquired from legacy applications (e.g., if service order application 112 and/or dispatch system 114 are proprietary software applications). Alternatively, productivity management application 118, service order application 112, dispatch system 114, and/or loading program 116 may be implemented as a single application with one or more layers of access permissions established for each type of user associated with the enterprise of system 100 (e.g., technician, supervisor, manager, corporate officers, etc.).

In exemplary embodiments, system 100 users at one or more geographic locations contact host system 102 through one or more of user systems 106, 108. User systems 106, 108 may be coupled to host system 102 via a network 110. Each of user systems 106, 108 may be implemented using a general-purpose computer executing a computer program for carrying out the processes described herein. The user systems 106, 108 may be personal computers (e.g., a lap top, a personal digital assistant) or host attached terminals. If user systems 106, 108 are personal computers, the processing described herein may be shared by one or more of user systems 106, 108 and host system 102 (e.g., by providing an applet to user systems 106, 108). For purposes of illustration, user system 106 is operated by a technician for retrieving daily work lists and entering executed task data, and user system 108 is operated by a superior of the technician for gathering performance data associated with the technician and other direct reports, as well as for generating a variety of reports.

Network 110 may be any type of known network including, but not limited to, a wide area network (WAN), a local area network (LAN), a global network (e.g. Internet), a virtual private network (VPN), and an intranet. Network 110 may be implemented using a wireless network or any kind of physical network implementation known in the art. User system 106 and/or 108 may be coupled to host system 102 through multiple networks (e.g., intranet and Internet) so that not all user systems 106, 108 are coupled to host system 102 through the same network. One or more of user systems 106, 108 and host system 102 may be connected to network 110 in a wireless fashion. In one embodiment, network 110 is an intranet and one or more of user systems 106, 108 execute a user interface application (e.g. a web browser) to contact host system 102 through network 110. In another exemplary embodiment, user systems 106, 108 are connected directly (i.e., not through network 110) to host system 102 and host system 102 is connected directly to or contains storage device 104.

Storage device 104 includes data relating to assigned and completed tasks for workers associated with host system 102 and may be implemented using a variety of devices for storing electronic information. It will be understood that storage device 104 may be implemented using memory contained in host system 102 or it may be a separate physical device. Storage device 104 may be logically addressable as a consolidated data source across a distributed environment that includes network 110. Information stored in storage device 104 may be retrieved and manipulated via host system 102 and/or via user systems 106, 108. In addition to storing work lists, storage device 104 may also store task-related records and reports. The records are described further in FIG. 2 and the reports are described further in FIGS. 4-8.

Figure 2:
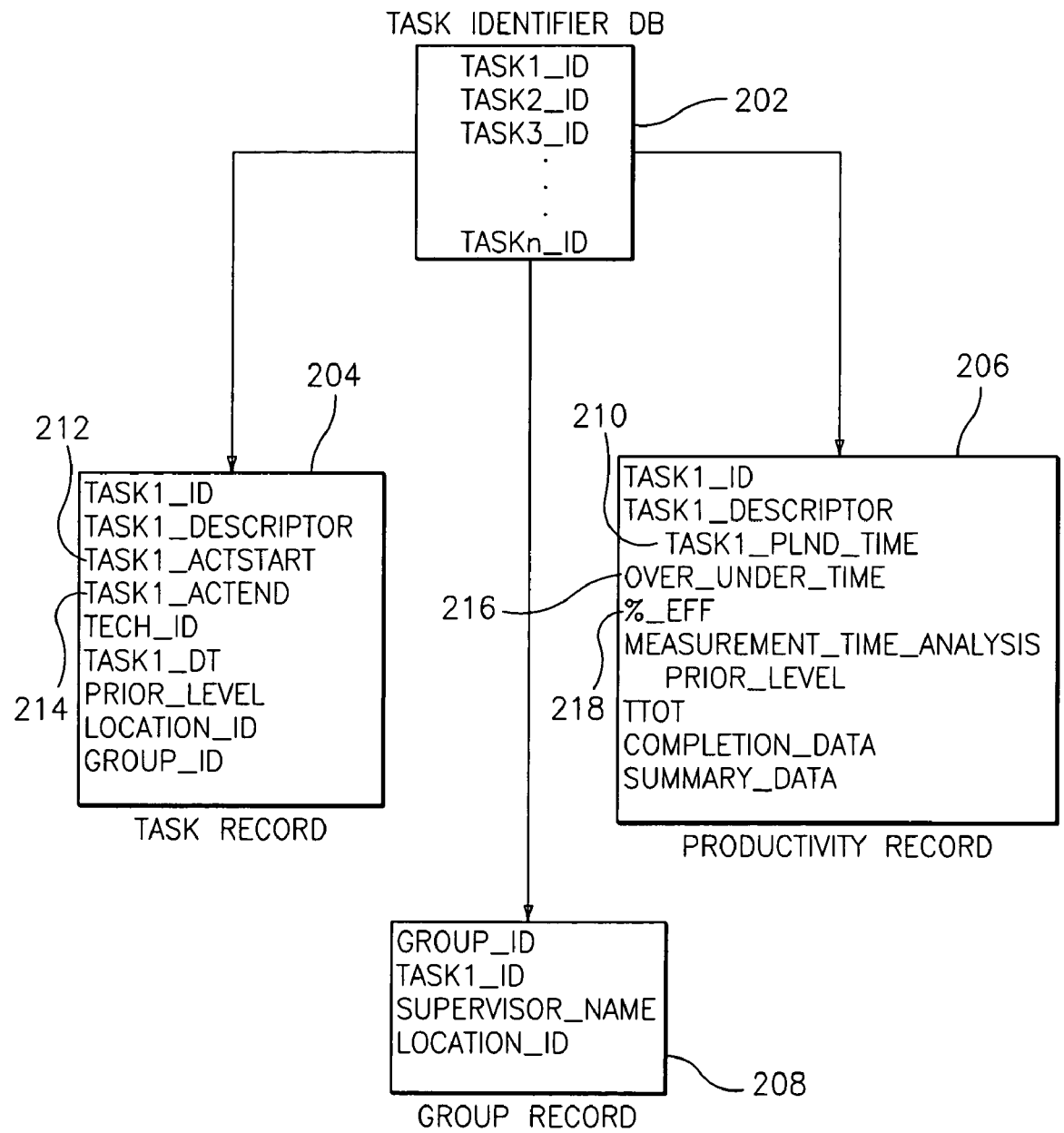
FIG. 2 is a block diagram of a task database and a sampling of tables utilized in the implementation of productivity management activities in exemplary embodiments.

Turning now to FIG. 2, a block diagram of exemplary database tables utilized by host system 102 in implementing productivity management activities will now be described. Tables 202-208 may be stored within one or more databases that are located in storage device 104. Task identifier table 202 includes a listing of each task associated with the enterprise implementing the productivity management activities in system 100 of FIG. 1. Each task is distinguishable by a unique identifier.

FIG. 2 also includes a task record table 204 that includes one record for each task instantiation in the system. As used herein, a task refers to any activity (e.g., repair tasks, preventative maintenance tasks, installation tasks, work breaks, travel time between jobs, unscheduled assistance provided to co-workers, etc.) that is assigned to, and/or implemented by, a worker during the course of a designated time period (e.g., business day). In exemplary embodiments, task records in table 204 each includes fields for: a unique task identifier; a task descriptor that provides a general description of the task; actual task start and end times for documenting and tracking the amount of time a worker takes to perform a task; a date for which the task is scheduled to be performed; a task priority level; a technician identifier; and location and/or group identifiers. A typical task record in table 204 may include many fields for searching on various characteristics of the task.

FIG. 2 also depicts a productivity record table 206 that includes one record for each task instantiation in the system. Each record in table 206 includes fields for entering productivity management activity data. A subset of the fields in a productivity record of table 206 includes a planned time for performing a task (e.g., an average amount of time in which a given task should be completed); an amount of the time in which an executed task (i.e., actual task time) is over or under the planned task time; an efficiency rating associated with an executed task; task completion data; and summary data. These and other fields are referred to herein as engineered service measures and are described further in the user interface screen windows of FIGS. 4-8. FIG. 2 also depicts a group record table 208, which includes a record for each task instantiation in the system. Each record in tale 208 includes fields for associating a task with an individual performing the task, a supervisor of the individual, and a location in which the task is to be performed.

Figure 3:
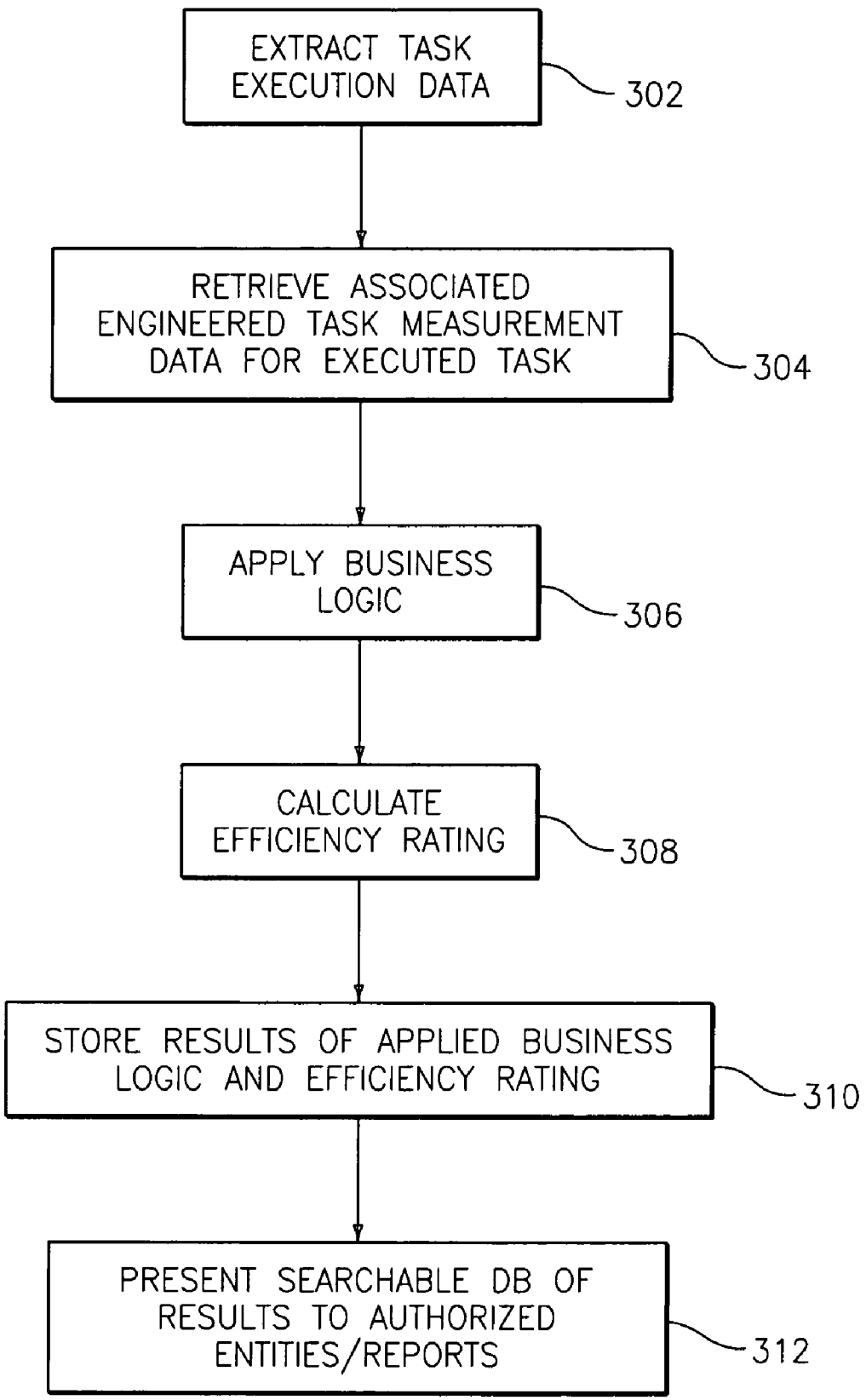
FIG. 3 is a flow diagram of a process for implementing productivity management activities in exemplary embodiments.

Turning now to FIG. 3, an exemplary flow diagram for implementing the productivity management activities will now be described. Productivity management application 118 periodically extracts selected task execution data from task record table 204 at step 302. Each record in task record table 204 includes a task identifier that may be utilized as a key for associating the record with a productivity record in table 206 and/or group record in table 208. Productivity management application 118 retrieves engineered task measurement data for the task identified in step 302 at step 304. The tasks may include items relating to, e.g., installation, maintenance, and routine jobs performed by technicians in a telecommunications central office environment. The productivity record specifies a planned time for executing the task via field 210 in productivity record table 206 of FIG. 2.

Business logic is applied to the extracted task execution data at step 306. Business logic includes, e.g., calculating the difference between the actual time it took to execute the task and the planned time for execution resulting in an overage or underage time. This difference may be determined by subtracting the TASK1_ACTSTART time in field 212 from the TASK1_ACTEND time in field 214 (both in task record table 204) and then using this result, calculating the difference between the TASK1_PLND_TIME in field 210 (in productivity record table 206) and the result. A negative number indicates that the technician performed the task in under the expected or planned task time. A positive number indicates that the task was performed in over the expected or planned task time. The overage/underage is recorded as OVER_UNDER_TIME in field 216 (in productivity record table 206). Using this calculation, an efficiency rating may be generated and entered as %_EFF in field 218 at step 308. Other information may be utilized along with the efficiency rating in determining overall performance. For example, the business logic may factor in obstacles that may have prevented the task from being completed, issues that may have caused the task to be only partially completed, or problems that may account for any overages in time that occurred in completing the task. This criteria and resulting data are described further in FIGS. 4-8.

The results of the application of the business logic may be stored in one or more productivity records in table 206 of storage device 104 at step 310. The productivity records in table 206 are searchable by authorized individuals of system 100 (e.g., supervisors at user system 108) and reports may be generated at step 312.

Figure 4:
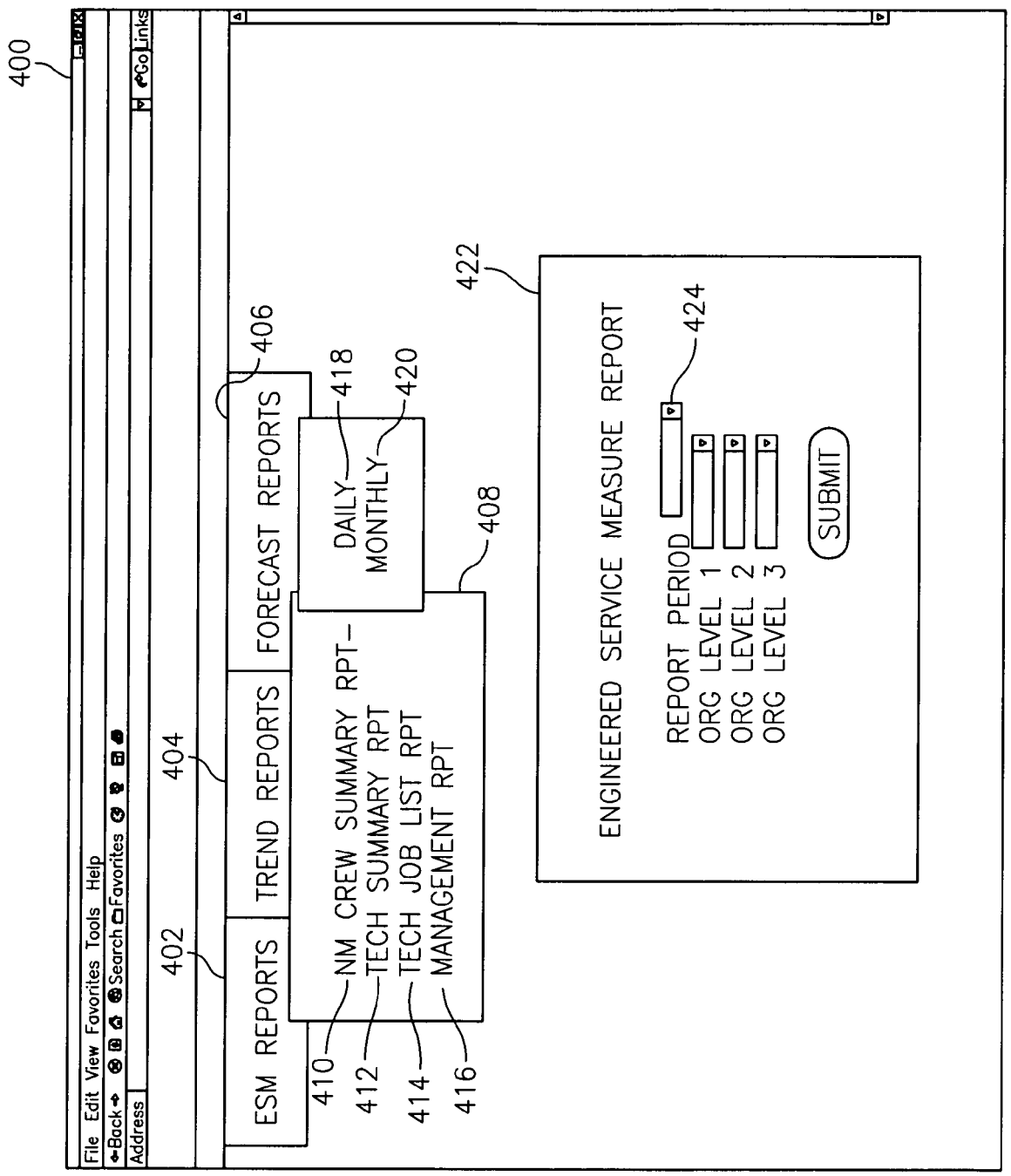
FIG. 4 is an exemplary user interface screen for facilitating report generation.

Turning now to FIG. 4 a user interface screen 400 is shown and described herein. A supervisor who desires performance information regarding his/her direct reports accesses the productivity management system via a web-based user interface and is presented with screen 400. Screen 400 provides a menu of three different types of reporting options available, namely, ESM reports 402, trends reports 404, and forecast reports 406. ESM reports are directed to specific technician performance of assigned tasks. Sample ESM reports are shown and described in FIGS. 5-7 and a sample trends report is shown and described in FIG. 8.

A supervisor who selects ESM reports 402 option is then presented with a submenu 408 of available ESM reports. Shown in submenu 408 are options for a network manager crew summary report 410, technician summary report 412, technician job list report 414, and management report 416. These reports may be further broken down into time periods. For example, the network crew summary report 412 may viewed as a daily report (option 418) or a monthly report (option 420). Once a supervisor selects a report, a subwindow 422 is presented which enables the supervisor to further drill down the report information by organization level and time period. For example, a supervisor may desire to view report data for a specified period of time by entering a time period in field 424. Organization level 1 may be used to view high-level report data (e.g., corporate level/general manager). Organization level 2 may be used to drill down the report data within the organization of level 1 (e.g., by department/office).

Figure 5:
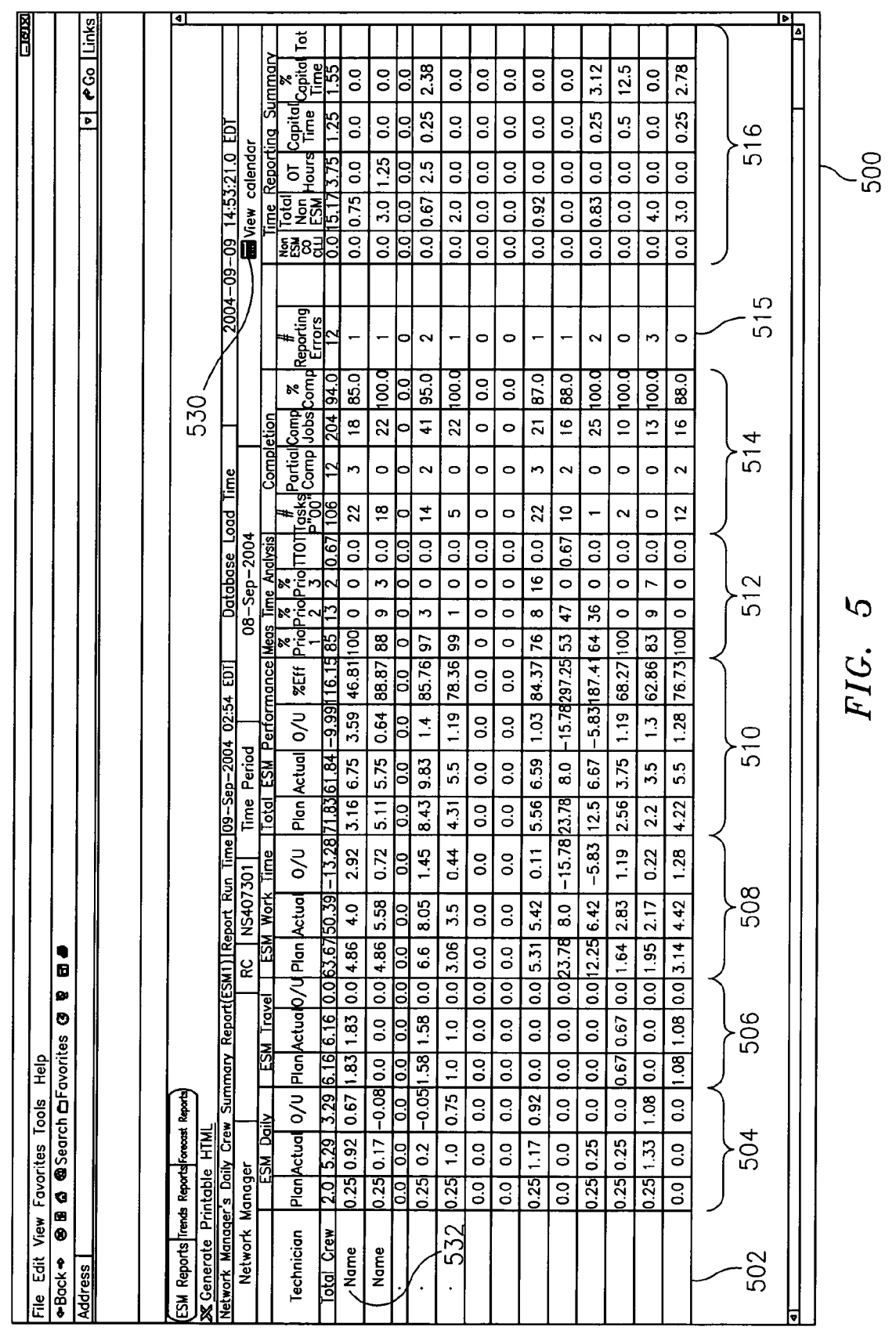

For purposes of illustration, a supervisor has selected to view a daily network manager crew summary report using options 412 and 418. The report period selected in subwindow 422 is Sep. 8, 2004. FIG. 5 illustrates a sample daily network manager crew summary report generated via the productivity management system. Summary report 500 identifies each technician associated with the supervisor via column 502. Performance information is differentiated into categories including ESM daily tasks in columns 504, ESM travel tasks in columns 506, ESM work time in columns 508, total ESM performance in columns 510, measurement time analysis in columns 512, task completion in columns 514, and time reporting summary in columns 516.

ESM daily tasks in columns 504 refer to everyday administrative tasks and employee work breaks. ESM travel tasks in columns 506 refer to the amount of time incurred in going from job to job during a given day. ESM work time in columns 508 refer to the amount of time associated with executing tasks assigned to the technician in a work list for a given day. Columns 504-508 are comprised of three components: plan, actual, and O/U. Plan time refers to the amount of time a task is expected to take in accordance with the ESM measurements devised by, or on behalf of, the enterprise. This data is reflected in TASK1_PLND_TIME field 210 of productivity record table 206 as described above in FIG. 2. Actual time is the time the technician entered for the task and is reflected in TASK1_ACTSTART and TASK1_ACTEND fields 212 and 214, respectively, of task record table 204 in FIG. 2.

Total ESM performance in columns 510 refer to an aggregate of the times reflected in columns 504-508 and also includes an efficiency rating calculated from these figures using business logic adopted via the productivity management system (reflected in %_EFF field 218 in productivity record 206 of FIG. 2). Measurement time analysis in columns 512 breaks down the percentage of time on tasks in accordance with each task's priority level assigned. This information may be useful in determining how much of the available assigned work was executed by priority. For example, low priority work is oftentimes found to be easier work as compared to higher priority work. Thus, it may be useful for a supervisor to know that a first technician who is 100% efficient has been performing consistently low priority work (e.g., checking fire extinguishers and other routine work) and a second technician who is 85% efficient has been performing consistently high priority work (e.g., a communications line at a bank is down). In addition, a total time spent on other tasks (e.g., tasks executed but not assigned to a technician) is also recorded in columns 512. This measurement may be entered in situations, e.g., when the technician is called to assist another technician due to unexpected circumstances.

Task completion in columns 514 break down tasks assigned by a number of tasks completed and partially completed, along with an percentage of completed work. A reporting errors column 515 is also included in report 500 which provides a number of errors reported for the technician for use in shedding light on any discrepancies in the actual task time incurred compared with the expected task time. Time reporting summary information in columns 516 refer to any anomalous work that is not measured by the enterprise or is noted but not defined. Columns 516 also record overtime hours incurred and capital time incurred.

Figure 6:
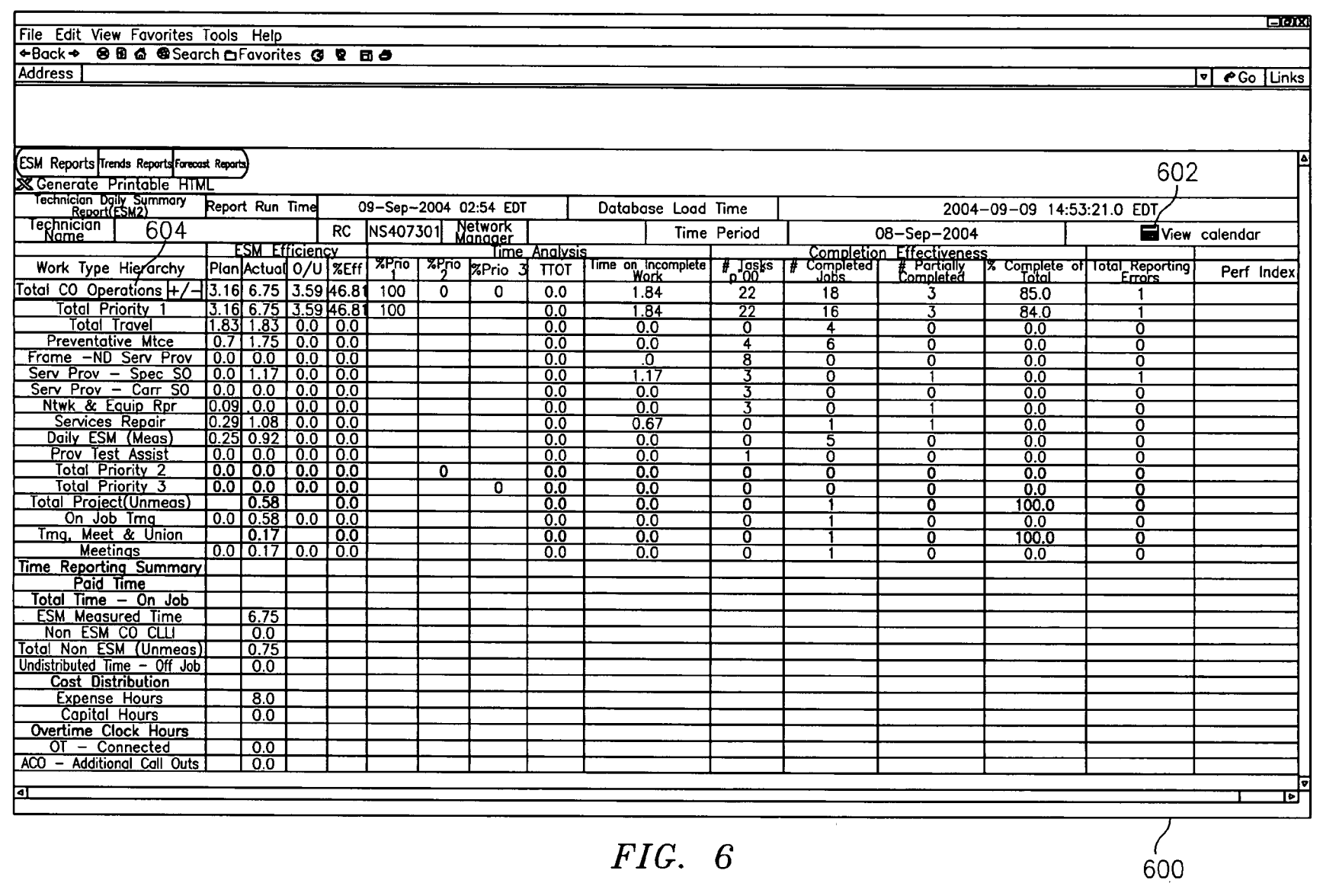

Screen 500 provides a link to additional information if desired by the supervisor. For example, a supervisor may select view calendar option 530 in order to view a report for a different day. In addition, a supervisor who desires specific information about a single technician in column 502 may select the desired technician name and the productivity management system retrieves and presents a technician daily summary report, a sample of which is shown in FIG. 6. The sample report 600 of FIG. 6 is presented for a technician who was selected from line 532 of FIG. 5. As can be seen from the report 600, much of the same information presented in report 500 for this technician is also presented in report 600, but with greater detail. For example, the tasks performed are broken down in the report 600 by priority. Then, efficiency data is provided for each of the items broken down within the report 600.

As with the report of FIG. 5, report 600 also includes links to additional information such as a view calendar option 602 and a link "Total CO Operations" 604 which, when selected, causes the productivity management system to retrieve and present a job detail report, a sample of which is shown in FIG. 7. Job detail report 700 provides specific information for the technician including additional information regarding any reporting errors (see generally items 702) that were identified in report 500 in column 515. This information enables a supervisor to better understand any discrepancies in the technician's performance as represented in these reports.

As indicated above, other reports available via the productivity management system includes trends reports. A trend report provides information concerning patterns of productivity and performance issues and observations using business logic provided by, or on behalf of, the enterprise. Various types of trend reports are available for levels of hierarchy within the enterprise and includes an Office Completion report, Network manager completion report, Turf Completion report, and Weekly/Monthly Trend report, which can further be broken down by, e.g., Office, Network Manager Turf, Area Manager Turf, General Manager Turf, Network Vice President Turf, and generally by the enterprise. A sample weekly/monthly trend report by Network Management Turf is shown in FIG. 8. This and other trend reports may be generated using search criteria similar to that shown and described in FIG. 4. Report 800 displays the total number of hours worked for a period of time (e.g., September 1-4 and 5-8. This total number of hours worked is then broken down by categories and priority levels as described above.

As described above, the productivity management system facilitates the tracking and governance of performance standards established by a business enterprise using engineered service measures that include scientifically derived and physically verified times established for performing specific tasks associated with each job that is performed within the enterprise environment. Factors that may potentially affect the successful execution of each of these jobs is taken into account in order to acquire the most accurate picture of worker performance. Load balance forecasting is also implemented using the productivity management system in order to facilitate necessary short and long term load balance assessments.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for managing productivity, comprising:
   establishing, via a computer processing device, a planned execution time for performing a task, the task being assigned a unique identifier;
   comparing the planned execution time with an actual execution time for
   performing the task, the actual execution time extracted from a task dispatch system via the unique identifier;
   calculating, via the computer processing device, an efficiency rating based upon the comparing; and
   associating the efficiency rating with at least one of:
   an individual performing the task;
   a supervisor of an individual performing the task;
   a group of individuals associated with an individual performing the task; and
   an organization associated with an individual performing the task, the method further comprising:
   measuring time spent on a non-assigned task; and
   factoring the time spent into the efficiency rating, the non-assigned task including assisting a co-worker on a task assigned to the co-worker.

2. The method of claim 1, further comprising:
   measuring time spent on priority work; and
   factoring the time spent on priority work into the efficiency rating, the priority
   work broken down by levels of importance.

3. The method of claim 1, wherein tasks are broken down by:
   routine tasks including daily work breaks and administrative duties;
   assigned tasks designated for execution during a specified work day; and
   travel time associated with going to and from the routine tasks and the assigned tasks.

4. The method of claim 1, further comprising:
   differentiating between a number of partially completed tasks and a number of
   fully completed tasks;
   measuring productivity for the partially completed tasks and the number of
   fully completed tasks as a percentage of a total number of assigned tasks; and
   factoring into the measuring any errors in task reporting, the errors accounting
   for discrepancies in productivity expectations.

5. The method of claim 1, further comprising:
   presenting a searchable database of task information, the task information
   searchable by hierarchical levels of task detail, the levels including a task level, an individual level, a group level, and an organization level.

6. The method of claim 5, wherein the reports include:
   individual performance reports; and
   trends reports.

7. The method of claim 1, wherein the task is related to a telecommunication central office function assigned to a technician.

8. A system for managing productivity, comprising:
   a host system executing a dispatch system and a productivity management application; and
   a storage device in communication with the host system, the productivity management application performing:
   receiving a planned execution time for performing a task, the task being assigned a unique identifier;
   comparing the planned execution time with an actual execution time for performing the task, the actual execution time extracted from a task dispatch system via the unique identifier;
   calculating an efficiency rating based upon the comparing;
   associating the efficiency rating with at least one of:
   an individual performing the task;
   a supervisor of an individual performing the task;
   a group of individuals associated with an individual performing the task; and
   an organization associated with an individual performing the task; and
   storing the efficiency rating in the storage device, the method further comprising:
   measuring time spent on a non-assigned task; and
   factoring the time spent into the efficiency rating, the non-assigned task including assisting a co-worker on a task assigned to the co-worker.

9. The system of claim 8, wherein the productivity management application further
   performs:
   measuring time spent on priority work; and
   factoring the time spent on priority work into the efficiency rating, the priority work broken down by levels of importance.

10. The system of claim 8, wherein tasks are broken down by:
    routine tasks including daily work breaks and administrative duties;
    assigned tasks designated for execution during a specified work day; and
    travel time associated with going to and from the routine tasks and the assigned tasks.

11. The system of claim 8, wherein the productivity management application further performs:
- differentiating between a number of partially completed tasks and a number of fully completed tasks;
- measuring productivity for the partially completed tasks and the number of fully completed tasks as a percentage of a total number of assigned tasks; and
- factoring into the measuring any errors in task reporting, the errors accounting
- for discrepancies in productivity expectations.

12. The system of claim 8, wherein the productivity management application further performs:
- presenting a searchable database of task information, the task information searchable by hierarchical levels of task detail, the levels including a task level, an individual level, a group level, and an organization level.

13. The system of claim 12, wherein the reports include:
- individual performance reports; and
- trends reports.

14. The system of claim 8, wherein the task is related to a telecommunication central office function assigned to a technician.

15. A computer program product for managing productivity, the computer program product comprising:
- a storage medium readable by a processing circuit and storing instructions for execution by the processing circuit for facilitating a method comprising:
- establishing a planned execution time for performing a task, the task being assigned a unique identifier;
- comparing the planned execution time with an actual execution time for performing the task, the actual execution time extracted from a task dispatch system via the unique identifier;
- calculating an efficiency rating based upon the comparing; and
- associating the efficiency rating with at least one of:
- an individual performing the task;
- a supervisor of an individual performing the task;
- a group of individuals associated with an individual performing the task; and
- an organization associated with an individual performing the task, the method further comprising:
- measuring time spent on a non-assigned task; and
- factoring the time spent into the efficiency rating, the non-assigned task including assisting a co-worker on a task assigned to the co-worker.

16. The computer program product of claim 15, further comprising instructions for causing the processing circuit to implement:
- measuring time spent on priority work; and
- factoring the time spent on priority work into the efficiency rating, the priority
- work broken down by levels of importance.

17. The computer program product of claim 15, wherein tasks are broken down by:
- routine tasks including daily work breaks and administrative duties;
- assigned tasks designated for execution during a specified work day; and
- travel time associated with going to and from the routine tasks and the assigned tasks.

\* \* \* \* \*